United States Patent [19]

Guo et al.

[11] Patent Number: 5,284,180

[45] Date of Patent: Feb. 8, 1994

[54] CONTROLLING VACUUM LEVEL WITH A TWO-LEVEL VACUUM SYSTEM CONTROLLER AND ADJUSTABLE SPEED DRIVE

[75] Inventors: Fangjiang Guo, Ithaca; Roger A. Pellerin, Freeville; David C. Ludington; Daniel J. Aneshansley, both of Ithaca, all of N.Y.

[73] Assignee: Cornell Research Foundation, Inc., Ithaca, N.Y.

[21] Appl. No.: 905,744

[22] Filed: Jun. 29, 1992

Related U.S. Application Data

[62] Division of Ser. No. 623,464, Dec. 7, 1990, Pat. No. 5,141,403.

[51] Int. Cl.⁵ .................................................. G05D 16/16
[52] U.S. Cl. ................................. 137/488; 119/14.44; 137/907
[58] Field of Search .................. 137/907, 488, 494; 119/14.44

[56] References Cited

U.S. PATENT DOCUMENTS

| | | | |
|---|---|---|---|
| 3,053,272 | 9/1962 | Babson | 137/907 X |
| 3,373,720 | 3/1968 | Duncan . | |
| 3,482,593 | 12/1969 | Heiman et al. . | |
| 3,783,837 | 1/1974 | Olander . | |
| 3,938,547 | 2/1976 | Jones | 137/907 X |
| 4,166,476 | 9/1979 | Yamanaka et al. . | |
| 4,295,490 | 10/1981 | Boudreau . | |
| 4,313,396 | 2/1982 | Olofsson . | |
| 4,605,040 | 10/1986 | Meermoller . | |
| 4,836,241 | 6/1989 | Schoenwald | 137/907 X |
| 4,919,168 | 4/1990 | Wagner | 137/907 X |
| 4,921,006 | 5/1990 | Evans . | |
| 4,944,249 | 7/1990 | Takeuchi et al. | 119/14.44 |
| 5,010,844 | 4/1991 | Takeuchi et al. | 119/14.25 |

FOREIGN PATENT DOCUMENTS

| | | | |
|---|---|---|---|
| 3420144 | 12/1985 | Fed. Rep. of Germany . | |
| 1440901 | 6/1976 | United Kingdom | 137/907 |
| 1588715 | 4/1981 | United Kingdom | 137/907 |

*Primary Examiner*—Stephen M. Hepperle
*Attorney, Agent, or Firm*—Jones, Tullar & Cooper

[57] ABSTRACT

A low-energy-consuming apparatus and method for controlling vacuum levels in machine milking and other vacuum systems subject to air leakage utilizes in combination a high vacuum reserve, a low-vacuum end (pipelines), a dual vacuum controller positioned between the high-vacuum reserve and the low-vacuum end and an adjustable speed drive (ASD) motor on a vacuum pump to regulate the delivered air to match the air usage in the low-vacuum end. The dual vacuum controller senses vacuum disturbances in the low-vacuum end and adjusts the flow rate of air from the low-vacuum end to the high-vacuum reserve rather than using external air makeup, thus providing a controlled vacuum with minimum pressure variance and energy input. Energy savings and demand reduction of about 50 percent (50%) during milking are realized under the new system.

8 Claims, 6 Drawing Sheets

CONTROLLING VACUUM LEVEL WITH A TWO-LEVEL VACUUM SYSTEM CONTROLLER AND ADJUSTABLE SPEED DRIVE

This is a divisional of copending application(s) Ser. No. 07/623,464 filed on Dec. 7, 1990 now U.S. Pat. No. 5,141,403.

This invention relates to an improved apparatus and method for controlling vacuum levels in machine milking and other systems subject to air leakage.

BACKGROUND OF THE INVENTION

A milking system is one of the most important components on a dairy farm. It is used more hours per year than any other type of equipment on the farm. A key component of a milking system is the vacuum pump which is used to remove air from the milking system pipelines to create a partial vacuum.

The vacuum levels normally used for milking range from 13 to 15 in-Hg. Conventional systems use an oversized vacuum pump for vacuum stability when a milking unit falls off. In such a case, air flow changes by 20 to 35 cfm.

In a conventional system, the milking vacuum level is maintained by a vacuum controller which regulates the desired vacuum level by admitting external air as necessary when the vacuum reaches the predetermined setting. In the conventional system, the vacuum controller is sized to admit full vacuum pump capacity at the system's operating vacuum level. Vacuum fluctuations caused by changes in air usage, teat cup attachment, liner slip and unit fall-off, are compensated by the vacuum controller. The sensitivity of the controller should be such that there will be not more than about $\pm 0.5$ in-Hg vacuum fluctuation in a properly sized and maintained milking system, as measured in the main vacuum supply line.

Considerable energy is wasted by the vacuum pump/motor on dairy farms. The output capacity (cfm) of the vacuum pump always exceeds the capacity needed to milk cows and wash pipelines. Vacuum pumps run at full speed and load regardless of actual need for air.

In the conventional system, the vacuum level is maintained at $+/-0.5$ in-Hg by admitting or restricting air flow through a controller/regulator system. This traditional method of maintaining a constant vacuum at varying air flows is energy inefficient.

There is a need to provide an improved vacuum milking system which operates more efficiently than the conventional fixed pump speed system.

SUMMARY OF THE INVENTION

It is, therefore, an object of the present invention to provide an improved vacuum milking system wherein the energy requirement for maintaining the required vacuum level is markedly reduced over conventional vacuum pump milking systems.

A further object of the invention is the provision of a two-level vacuum system and process wherein the low-side vacuum can be maintained at a selected level with a specified tolerance or variance by feedback adjustment of the speed of the high-side vacuum pump motor.

A further object of the invention is the provision of a dual-vacuum controller for monitoring the vacuum in the low-vacuum end (pipeline) of a system subject to occasional leakage and to stabilize the vacuum in that low-vacuum end during periods of vacuum disturbances by connecting the low-vacuum end to a high-vacuum reserve through a regulator.

Another object of the invention is to provide a method for maintaining with minimum variance the stability of a specified low vacuum.

The invention relates to a low-energy-consuming two-level vacuum system, comprising a combination of a high-vacuum reserve, a low-vacuum end (low-vacuum pipelines), a dual vacuum controller to monitor the vacuum in the low-vacuum end and control the flow of air from the low-vacuum end to the high-vacuum reserve, and a vacuum pump operated under adjustable speed drive control (ASD) responsive to the vacuum changes in the high vacuum reserve.

The terms low-vacuum end and low-vacuum pipelines are used interchangeably to designate that part of the dual-vacuum system which is subject to air leakage and located downstream of the high-vacuum reserve and the dual-vacuum controller. In the vacuum milking system shown in FIG. 1 the low-vacuum end 3 incorporates all of the low-vacuum pipelines including those indicated as milking line 2. It is understood that the vacuum in the high-vacuum reserve and the low-vacuum pipelines can be equal during periods when there is a severe disturbance in the low-vacuum pipelines. Under stable conditions, the high vacuum reserve is maintained at a higher vacuum than the low-vacuum pipelines.

In one form, the present invention includes a low-energy consuming vacuum milking system which maintains the required vacuum level in the presence of air leakage in the low-vacuum end of a two-level vacuum system. The system incorporates a high-vacuum reserve connected to a low-vacuum pipeline which is part of the low vacuum end. Such a system preferably includes the following elements:

a. a high-vacuum reserve;
b. a low-vacuum pipeline subject to air leakage;
c. a first controller means comprising:
(1) a connector having a first outlet connected to the high-vacuum reserve, a second outlet connected to said low-vacuum pipeline, an orifice between the first and second outlets, and a valve for the orifice to control air flow therebetween;
(2) a vacuum sensor chamber including a sensor responsive to vacuum in the low-vacuum pipeline to adjust the valve for orifice; and
(3) a regulator for the sensor chamber to provide a reference vacuum whereby substantially constant vacuum is maintained in the low-vacuum pipeline;
d. a vacuum pump connected to the high-vacuum reserve for maintaining a constant high vacuum;
e. an adjustable speed drive motor connected to the vacuum pump; and
f. a second controller responsive to vacuum changes in the high-vacuum reserve due to variations in the flow of air from the low-vacuum pipeline to control the speed of the drive motor in accordance with changes in the high vacuum whereby the vacuum in the system is maintained with optimum energy conservation.

More generally, the invention relates to a dual-vacuum controller adapted to monitor a low vacuum end (pipeline) of a system subject to occasional leakage and to stabilize the vacuum in the low-vacuum end during periods of vacuum disturbances by regulating the amount of air passing from the low-vacuum end via a high-vacuum reserve to a vacuum pump. In accordance with the present invention, such a controller incorporates the following:

a. a connector having a first outlet connected to a high-vacuum reserve, a second outlet connected to a low-vacuum end, orifice means between first and second outlets, and valve for the orifice to control air flow therebetween;

b. a vacuum sensor chamber including means responsive to vacuum in the low-vacuum end to adjust the valve for the orifice; and c. a regulator for the sensor chamber to provide a reference vacuum whereby substantially constant vacuum is maintained in the low-vacuum end.

The invention also is directed to a method for maintaining the stability of a specified vacuum with minimum variance in the low-vacuum end of a vacuum milking system having a low-vacuum pipeline and a high-vacuum reserve. The method includes the following steps:

a. providing a high-vacuum reserve;

b. connecting a low-vacuum pipeline subject to leakage through a flow controller to the high-vacuum reserve;

c. providing a reference vacuum in the controller sensing variations in the low-vacuum end;

d. varying flow from the low-vacuum pipeline to the high-vacuum reserve through the controller to maintain the vacuum in the low-vacuum pipeline within specified tolerance;

e. sensing variations in the high-vacuum reserve; and f. variably driving a vacuum pump connected to the high-vacuum reserve in accordance with sensed variations to maintain the high vacuum, the vacuum pump being driven only as required to maintain the desired vacuum in the milking systems, whereby air supplied to the pump is substantially supplied from the low-vacuum pipeline rather than from external air and energy is saved.

BRIEF DESCRIPTION OF THE DRAWINGS

The foregoing, and additional objects, features and advantages of the present invention will become apparent to those of skill in the art from a consideration of the following detailed description of the invention, taken with the accompanying drawings, in which:

FIGS. 3A and 3B respectively plot vacuum variation (inch Hg) and standard deviations (inch Hg) comparing the ASD/dual-vacuum system with the conventional system for the events unit-on, normal, unit-off and milk pump on.

DETAILED DESCRIPTION OF THE INVENTION

Vacuum pumps are driven are driven at constant speed (constant delivery) during milking and pipeline washing. The single phase 240 volts AC induction motor, the most commonly used motor for vacuum pumps, is a "constant speed" motor with little variation from no load to full load. To compensate for variation in air usage, a conventional milking system utilizes the air-inlet bypass method. Air is bled into the system to make up the difference between the capacity of the vacuum pump and the air actually used by the milking systems. This wastes considerable energy.

Figure 1:
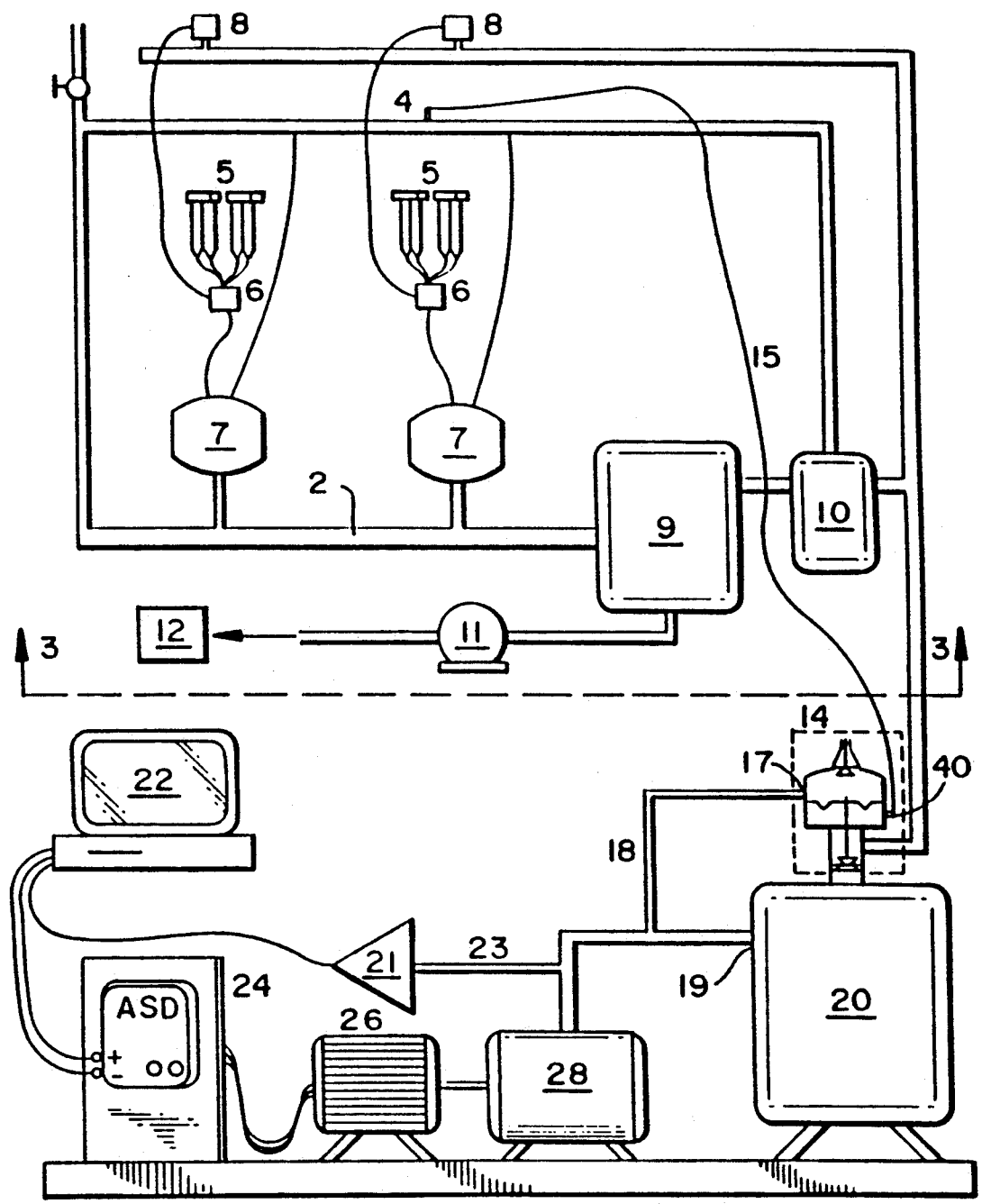
FIG. 1 is a schematic diagram of a two-level vacuum milking system operated with automatic speed drive vacuum pump and having a dual-vacuum controller positioned between a high-vacuum reserve and a low-vacuum pipeline of a vacuum milking system subject to air leakage.

In accordance with the present invention, a dual-vacuum system incorporates an adjustable speed drive (ASD) vacuum pump system, a high-vacuum reserve and a first controller means positioned between the high-vacuum reserve and the low-vacuum end of the system, illustrated at 3 in FIG. 1 and typically including the milking line 2 in a milking system.

FIG. 1 shows a schematic diagram of a dual-vacuum system with an adjustable speed drive controller 24, a high-vacuum reserve 20, and a first vacuum controller means 14. Vacuum controller 14 is shown in an enlarged schematic diagram in FIG. 2.

The adjustable speed drive controller 24 is connected to a vacuum pump-motor 26 which drives a vacuum pump 28, to maintain a desired vacuum in the high-vacuum reserve tank 20. A pressure transducer 21 senses the pressure in the high-vacuum reserve 20 via connector 23 and produces an electrical signal which is interpreted by a computer 22 or microprocessor which in turn sends a signal to the adjustable speed drive controller 24. The speed of the motor 26 and vacuum pump 28 are controlled response to the signal.

The dual-vacuum controller 14 is preferably positioned between the high-vacuum reserve tank 20 and the low-vacuum end (low-vacuum pipeline) 3. The low-vacuum end pipeline system 3, which comprises milking pipeline 2, teat cup assembly 5, claw 6, weight jar or milk meter 7, receiver 9, and sanitary trap 10, is at a lower vacuum than the high-vacuum reserve 20. One end of a vacuum feedback line 15 is connected at 4 to the low-vacuum end pipeline system 3 with the other end connected to a feedback vacuum inlet 40 of controller 14. An aspirator line 18 is connected between the controller 14 at port 17 and the high-vacuum reserve tank at vacuum port 19. The purpose of the vacuum controller 14 is to control air flow from the low-vacuum side 3 to the high-vacuum reserve 20, thereby maintaining a stable low-vacuum level throughout the milking system. The high-vacuum distribution tank 20 is a high-vacuum reservoir maintained at a vacuum higher than low-vacuum side. Vacuum in pipeline 3 is maintained at the proper vacuum for milking; namely, on the order of 13-15 in-Hg. A preferred range for the reserve vacuum is from about 1-4 in-Hg higher than the low vacuum side. Of course this range will depend largely on the system parameters, including the volume of the high-vacuum reserve.

Figure 2:
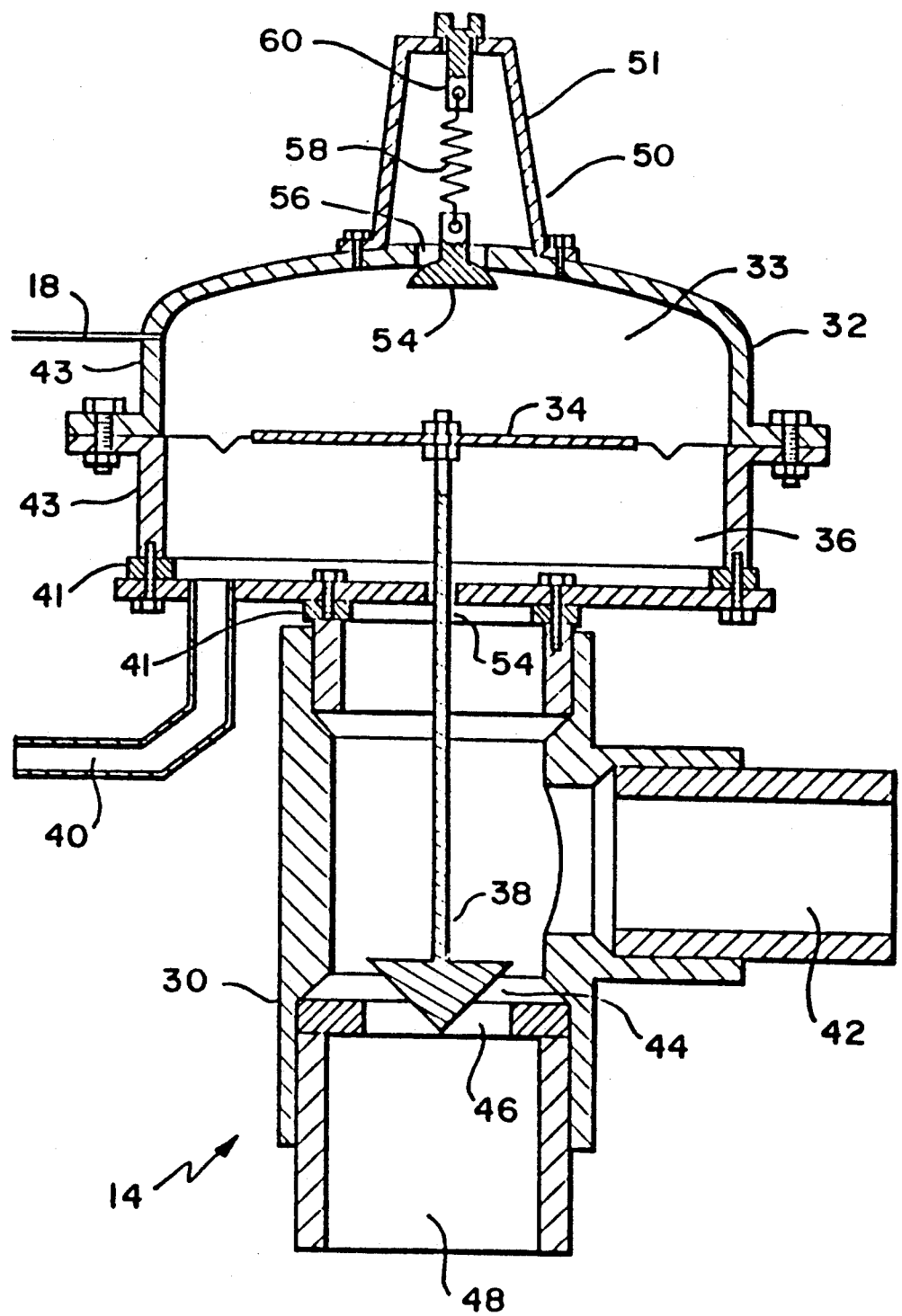
FIG. 2 is a schematic diagram of a dual-vacuum controller for sensing vacuum disturbances in the low-vacuum pipelines of the milking system and for adjusting the amount of air passing from the low-vacuum pipelines through the reserve tank to the vacuum pump.

A preferred dual-vacuum controller 14 for the adjustable speed drive/two-level vacuum milking system is a diaphragm-driven cone controller shown in expanded view in FIG. 2. This controller operates to monitor the vacuum in the low-vacuum end 3 subject to occasional leakage and to stabilize the vacuum in the low-vacuum end 3 during periods of vacuum disturbances in the low-vacuum end by regulating the amount of air passing from the low-vacuum end via the high-vacuum reserve to the vacuum pump 28 the controller.

The moveable diaphragm and diaphragm plate 34 define within controller housing 32 a reference chamber 33 and sensor chamber 36. A vacuum reference regulator 50, for maintaining a constant vacuum inside the reference chamber 33, consists of an air permeable housing 51, small cone 55, an air inlet orifice 56 which adjusts the amount of air allowed to pass into chamber 33, a spring 58 attached to cone 55, and an adjustable screw 60 to set the cone position within the orifice 56 thus defining a specified reference vacuum within chamber 33. Housing 51 of regulator 50 is not sealed and admits sufficient air as needed through orifice 56.

Air controller of FIG. 2 is the key to maintaining vacuum level stability. This unit can affect not only how well vacuum levels will be controlled but also the efficiency of the whole system, for the quality of the controlled vacuum level depends on the sensitivity of this unit. Vacuum level will be unstable if the sensitivity of the controller is too high. On the other hand, it will take too long to recover the desired vacuum levels if the sensitivity is too low. The efficiency of the vacuum controlling system can be lowered if the reserve high-vacuum cannot be released completely when vacuum disturbances occur in the low-vacuum pipelines. This unit, therefore, should, therefore, have adequate sensitivity to quickly respond to the changes in low level vacuum, and it should release all or almost all of the reserved high-vacuum when it is required to do so.

By "high-vacuum reserve" is meant an energy storage system. It is a volume which is at a vacuum level higher than the vacuum level being controlled and into which air can be moved from the low-vacuum volume for the purpose of controlling the low vacuum. The volume of the high-vacuum reserve and the pressure differential between the controlled vacuum level and that of the high-vacuum reserve determines the energy stored. The needed energy is a function of the transient characteristics of air movement into the low vacuum volume (disturbance), the allowable vacuum variation in the controlled vacuum volume and the characteristics of the ASD drive.

The vacuum reference regulator 50 which is used to maintain a 'constant' vacuum inside the reference chamber 33 is not hermetically sealed. Air seepage through the structure 51 is sufficient to satisfy the amount of air required to pass through the cone valve opening at orifice 56. The structure 51 supports the spring 58, the adjustment screw 60 and cone 55 and extends over the opening at orifice 56. The reference vacuum is developed by drawing ambient air through the inlet orifice 56 into the reference and to via chamber 33, the air then flowing via aspirator line 18 to the high-vacuum reserve 20. The desired reference vacuum level is obtained by adjusting the spring tension through the adjustable screw 60. Under normal conditions, the small cone 54 is balanced by the spring force and vacuum force acting on it. With any disturbance in vacuum level, the cone 54 will automatically move up or down to let more or less air into the reference chamber 33 to maintain the vacuum level 'constant'. Air drawn into this unit is less than about 1.0 CFM.

The diaphragm and diaphragm-plate 34 serve as both a comparator and an actuator. The diaphragm compares the low-vacuum level inside the sensor chamber 36 with the desired or reference vacuum level inside the reference chamber 33. If there is a difference between these two vacuum levels, the diaphragm-plate will convert this vacuum difference into a force which moves the valve 44 up and down within orifice 46 to control the air flow from low vacuum side 3 of the system of FIG. 1 to the high-vacuum reservoir 20 of FIG. 1 to thereby maintain the desired low-vacuum levels in side 3.

Figure 6:
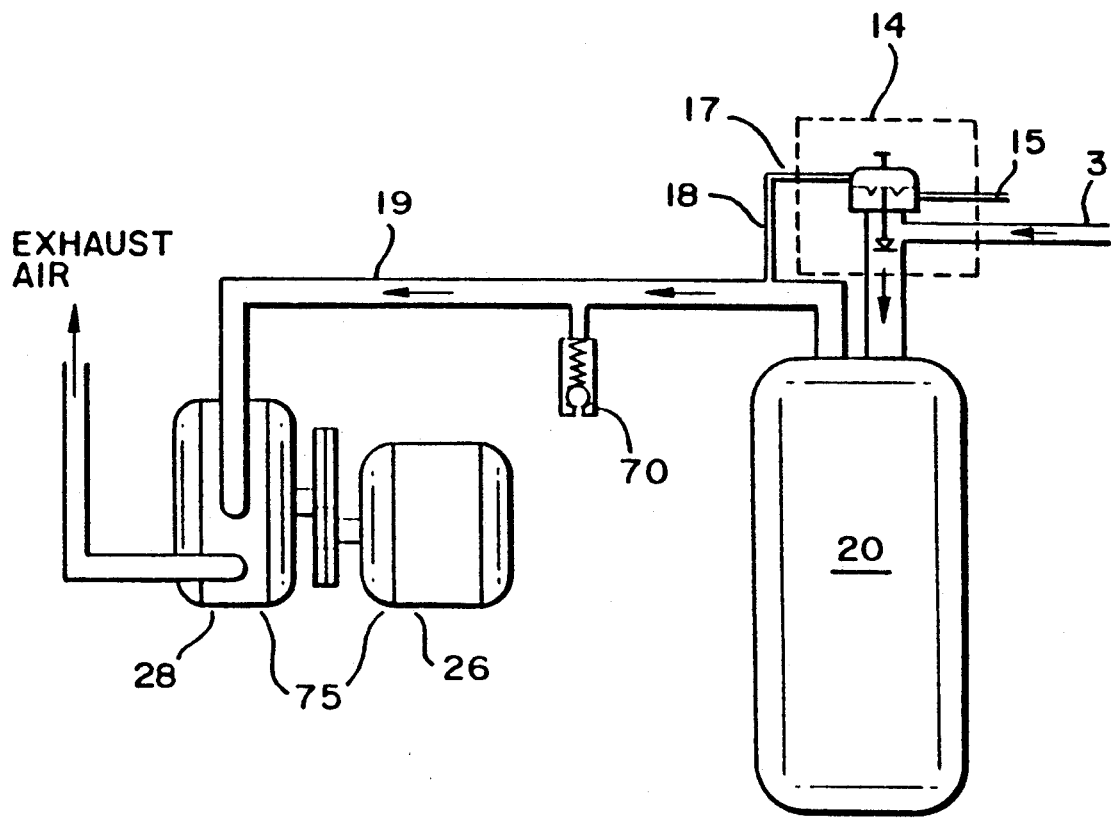
FIG. 6 is a schematic block diagram of a vacuum system utilizing a dual-vacuum controller positioned between high-vacuum reserve and the low-vacuum end (milking line) wherein the vacuum pump is fixed speed vacuum pump/motor.

An advantageous variant of the above described system is shown schematically in FIG. 6. This system uses the dual-vacuum controller 14 substantially as shown in FIG. 2 in combination with the high vacuum reserve 20 but substitutes a fixed speed pump-motor 75 in place of the adjustable speed drive motor-pump. In the modified system a high vacuum release valve 70 to maintain high-vacuum level is positioned between the vacuum pump 28 and the high-vacuum reserve 20. The vacuum release valve 70 functions similarly to any conventional vacuum controller which regulates the desired vacuum level by admitting external air as necessary when the vacuum reaches the predetermined setting. The vacuum release valve is sized to admit full vacuum pump capacity at the system operating vacuum level. Energy savings with this modified system would be somewhat less than with the ASD/dual-vacuum system, wherein the pump motor is down-sized. Test results show that the low-vacuum line can be stabilized within preferred variances in contrast to results shown in Example 1 for the conventional system where the response time to air flow disturbances was not fast enough to maintain desired vacuum levels.

The following Examples generally illustrate the invention, but should not be taken as a limitation thereof. One skilled in the art will recognize other useful applications in addition to the milking system uses described herein.

Example 1

Evaluation of an Adjustable Speed Drive on a Vacuum Pump

A model 75 (single phase, 240 V ac input) adjustable speed drive (ASD) provided by Glenscott Motor Controls, Rock Island, Ill. was coupled to a 5 hp three phase motor and essential auxiliary equipment provided by De Laval, Kansas City, Mo. The ASD controller and vacuum pump system were tested in the laboratory using a typical milking system. Step changes (plus and minus) in air flow to the system were used to determine the ability of the control system to maintain stability.

Tests of this system showed that the response time for this system to an air flow disturbance greater than 10 cfm was not fast enough to maintain vacuum level within acceptable limits. For a "pseudo" unit fall-off, vacuum variation with the ASD system was twice as large as with conventional controllers.

The rate of change of the motor/pump speed was adjustable with a variable resistor. The variable resistor was set to achieve the maximum acceleration under load of 200 rpm/sec. The system response time could not be shortened regardless of the type of feed-back control.

Example 2
Field Performance Tests of ASD/Dual-Vacuum System

A double five herringbone low line research milking parlor, located at the Cornell Teaching and Research Center, was modified to allow measurement of vacuum stability and energy used for both systems. Two systems were compared; the existing conventional system and the ASD/dual-vacuum system of the present invention. Each side of the parlor was independently operated by a 5 hp vacuum pump. Only one side of the double five parlor (5 units) was converted to accommodate both vacuum systems.

Both vacuum system configurations were evaluated during milking. The configurations evaluated were:
- A traditional milking vacuum system, that is the motor operated at rated speed and a vacuum controller to maintain the set vacuum level.
- The ASD/dual-vacuum system as depicted in FIG. 1 with high-vacuum reserve and dual-vacuum controller was operated at three high-vacuum levels, 16, 17 and 18 in-Hg. The milking vacuum (low-vacuum) level was maintained at 15 in-Hg for all tests.

Measurements were recorded for the following parameters:
Demand (kW) and power consumed (kWh) of vacuum pump-motor; control voltage to ASD controller; vacuum levels in the vacuum distribution tank and mid-location of the milk washing line; milk production using milk meters; and milking time.

This parlor configuration resulted in the wash line 4 as the location for monitoring the overall vacuum level during milking. Power used by the pump-motor was measured with a standard electric Wh meter. The kW demand was recorded by a power survey meter on a continuous chart. The two vacuum levels, input voltage to the ASD motor control and input current to the vacuum pump-motor were recorded on a Hewlett Packard (Model 3694) 4 channel tape recorded operating at 15/16 ips. A clamp-on ammeter with a Keithley digital multimeter with a 0 to 2 Vdc output was used to monitor ampere flow to the motor.

Testing Procedure

A group of ten Holstein cows in mid-lactation with an average milk production 34.3 (75.6 lb) per day were used throughout the field test. The same cows were milked once at the mid-day milking with each vacuum pump configuration. Two groups of 5 cows were milked in each test. The udders were washed and allowed two minutes of stimulation before milking. Each cow was identified. The milking units had automatic takeoff and automatic milk meters.

The vacuum levels were recorded at the wash line near the milking unit with responses evaluated under four different events during milking.
Milking units were attached; normal milking; milking units off; and milking transfer pump on or off.

Vacuum Fluctuation

Figure 3A:
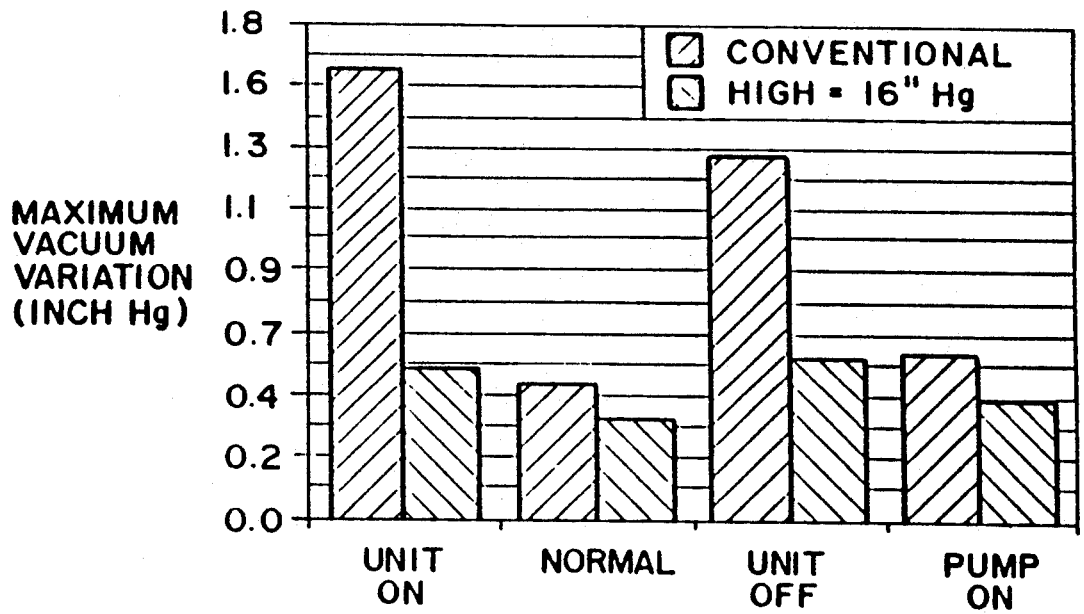
Figure 3B:
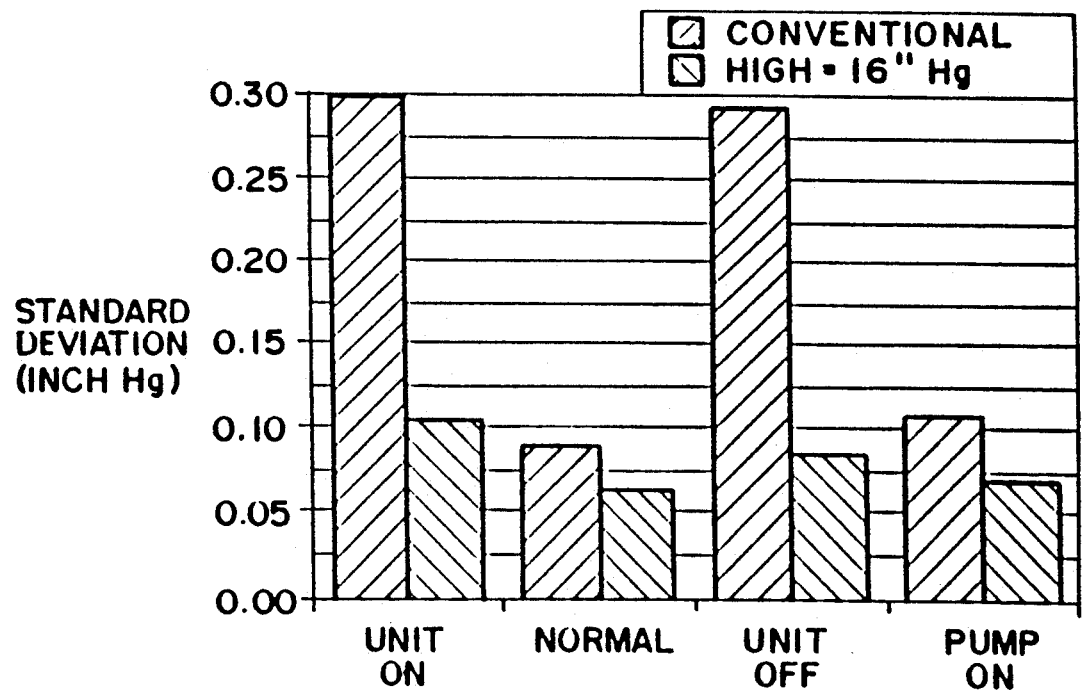

The vacuum fluctuations for the two control systems; conventional and ASD/dual-vacuum (three levels of high-vacuum) were analyzed during the above mentioned milking segments. The vacuum variation and standard deviation are the two parameters that bets define vacuum stability. The data for these two parameters and the four events are shown, graphically, in FIGS. 3A and 3B for comparison. Data for the dual-vacuum/ASD system, 16 in-Hg high-vacuum reserve is shown. The greatest milk line vacuum fluctuation occurred when the milking unit was attached and taken off the cows. The 16 in-Hg high-vacuum ASD/dual-vacuum system was much more stable than the conventional system. As shown in FIG. 3A, the vacuum variation (maximum-minimum) for the events (attached, units-off) for the conventional system were 1.6 and 1.3 in-Hg as opposed to the values of less than 0.7 in-Hg for the ASD/dual vacuum/vacuum reserve system. Similarly as seen in FIG. 3B for evaluations units-on and units-off, the standard deviation of vacuum fluctuations for the conventional system was about 0.3 in-Hg as opposed to about 0.1 in-Hg for the ASD/dual vacuum/-vacuum reserve system.

Power and Energy

The power used by the vacuum pump was measured at the input to the controller. The power measured included the controller and the vacuum pump-motor. The operating time was recorded for the various milking events, such as cow prep, milking, and moving cows in and out. Two groups of five cows each were milked using each vacuum system. The time between each group of cows milked was longer than normal milking system due to documentation delays.

Figure 4A:
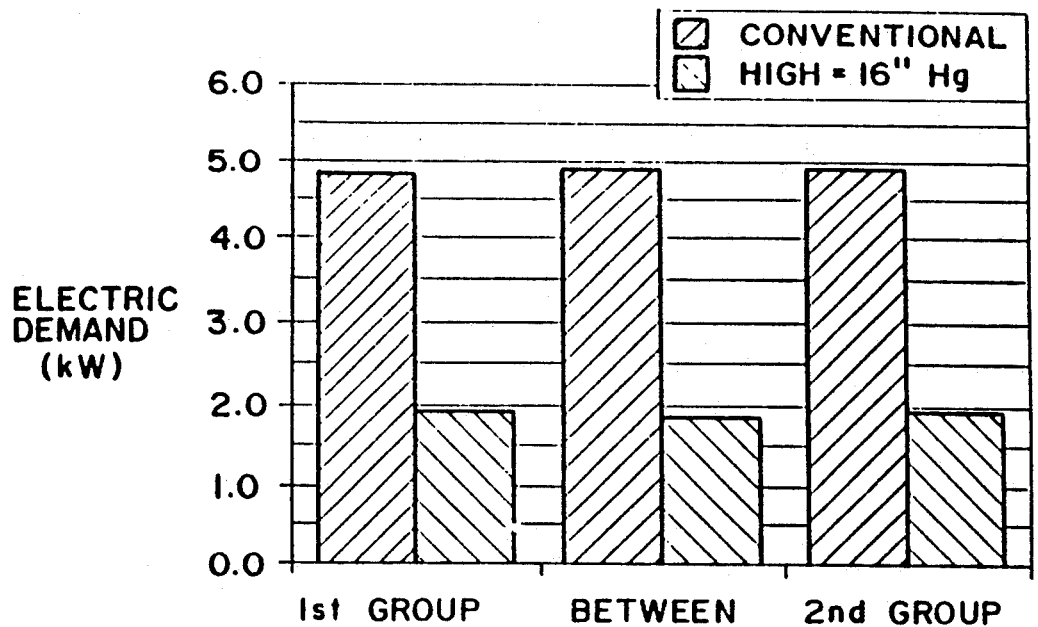
FIGS. 4A and 4B respectively plot electrical demand (kW) and energy usage (kWh) during the milking of two groups of five cows and the intermediate time period between groups and compares the ASD/dual-vacuum system with the conventional vacuum system.

FIG. 4A shows electric demand comparisons between conventional system and ASD/dual-vacuum system, excluding washing operation. It is seen that the average electrical demand (kW) for the ASD/dual-vacuum system is at least 50 percent less than the conventional system. It is noted that ASD/dual-vacuum system operating at 16 in-Hg high vacuum had the lowest power requirement during milking and between milkings.

A plot of the electrical demand (kW) versus time in minutes for the dual-vacuum/adjustable speed drive system (ASD) versus the conventional system is shown in FIG. 6. In the conventional system the electrical demand remains steady at about 5 kW during the milking cycle whereas the demand for the ASD system increases from about 2 to 3 kW when units go on and go off and steadies out at 2 kW during milking.

Figure 4B:
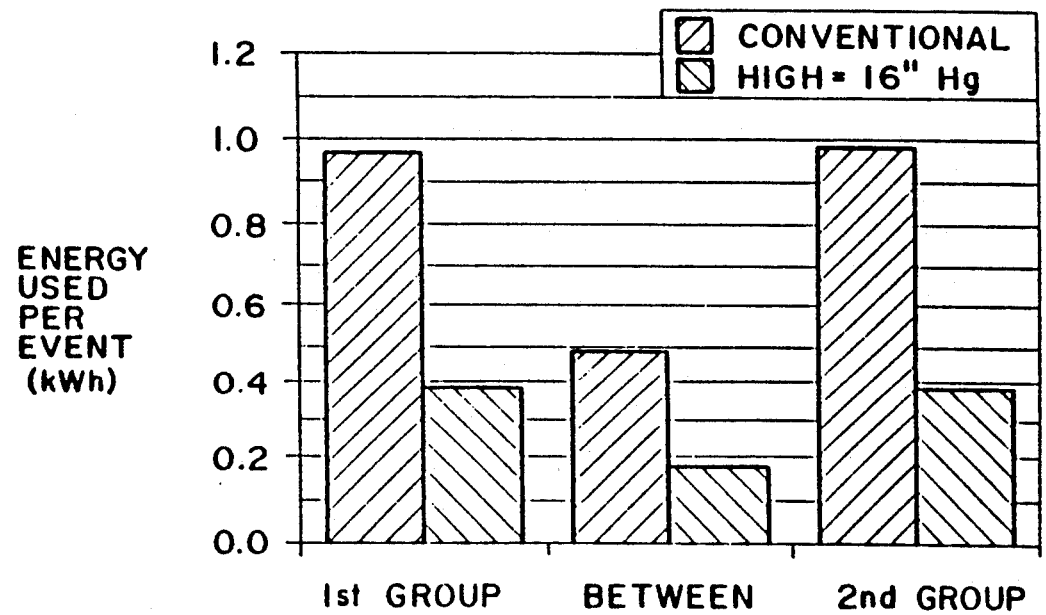
Figure 5:
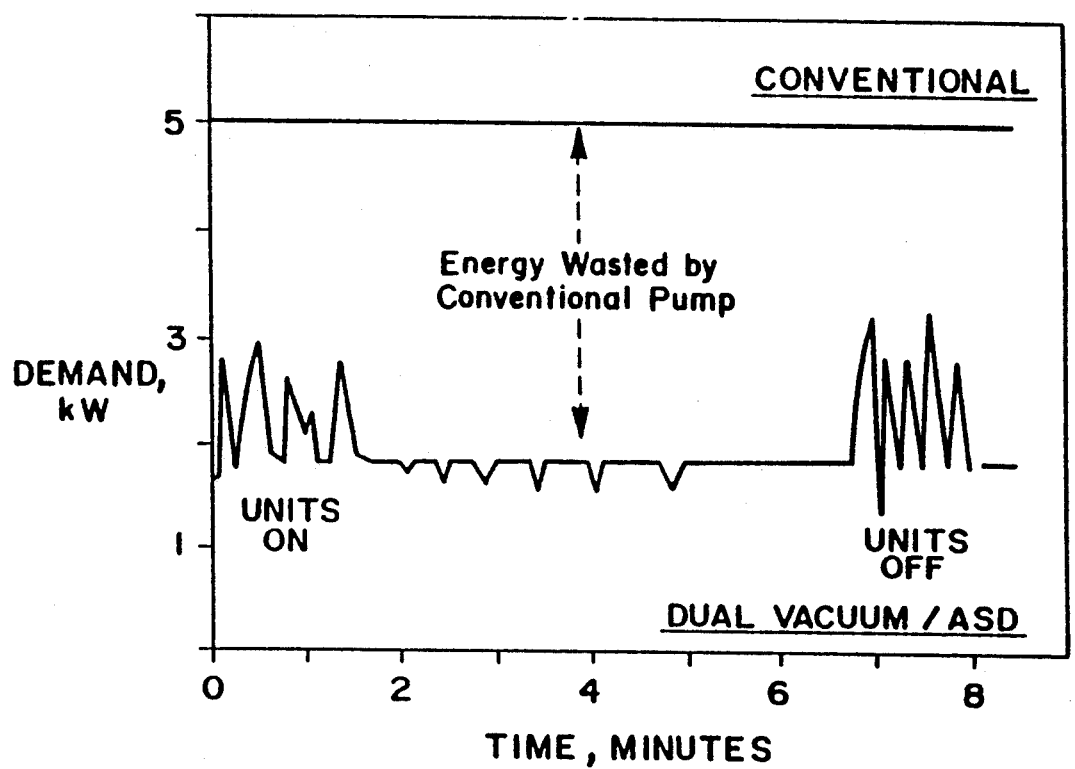
FIG. 5 is a plot of the electrical demand (kW) versus time in minutes for the dual-vacuum/adjustable speed drive (ASD) system versus the conventional vacuum system.

FIG. 4B shows the energy used (kWh) by each 'system' during milking and between milkings. Energy plotted was calculated based on the average demand (kW) for each period times the length of the period. For comparison a 'standard' milking time of 12 minutes and a 6 minute period between the first and second groups was used. The graph shows the energy used by the ASD/dual-vacuum system increasing as the vacuum level in the high-vacuum reserve increased. This is to be expected because the pressure differential across the pump is increased. The average energy consumed during milking (5 cows milked/group) by the ASD/dual vacuum system was reduced 58 percent as compared to the conventional vacuum system.

Conclusions

Based on the above experiment, a milking time of 2.45 hours with two milking per day, the 5 hp De Laval vacuum pump operating at constant rated speed with a conventional vacuum controller produced a demand of 4.89 kW. This is a time weighted average for actual milking (12 min) and for between group of cows (6 min). The same vacuum pump controlled by the ASD-/dual-vacuum system operating at a high-vacuum of 16 in-Hg required 1.93 kW, (weighted average). Using these values (4.89 and 1.93 kW), the energy savings would be about 60 percent.

What we claim is:

1. A dual-vacuum diaphragm-driven cone controller for monitoring the vacuum in an automated milking vacuum system having a low vacuum and subject to leakage and a high vacuum end during periods of vacuum disturbances by regulating the amount of air passing from the low vacuum end via the high vacuum reserve to a vacuum pump, which comprises:
   a) a connector having a first outlet connected to the high vacuum reserve, a second outlet connected to the low vacuum end of the automated milking system, orifice means between said first and second outlets, and valve means for said orifice means to control air flow therebetween;
   b) a vacuum sensor chamber;
   c) a reference chamber to provide a reference vacuum for said sensor chamber;
   d) an adjustable vacuum reference regulator connected to said reference chamber and supplying a selected amount of ambient air thereto to establish a reference vacuum in said reference chamber;
   e) diaphragm means connecting said reference chamber to said sensor chamber and movable in response to vacuum differences between the low vacuum end and the high vacuum reserve and rapidly responsive to changes in the low vacuum end; and
   f) shaft means connecting said diaphragm means to said valve means for said orifice to adjust said valve means to regulate the air flow through said connector, whereby substantially constant vacuum is maintained in the low vacuum end.

2. The controller of claim 1 wherein the vacuum in the high-vacuum reserve is about 15-18 in-Hg and the vacuum in the low-vacuum end is from about 13-15 in-Hg maintained within a variance of about +/−0.5 in-Hg.

3. The controller of claim 1, wherein said reference chamber is further connected to said high vacuum reserve.

4. The controller of claim 3, wherein said is connected to said low vacuum end, whereby said sensor chamber diaphragm means is responsive to pressure differences between said low vacuum end and the selected reference vacuum in said reference chamber to adjust said valve means.

5. A diaphragm-driven controller for monitoring and regulating the vacuum level in the low vacuum end of a vacuum system, comprising:
   a low vacuum line subject to leakage and vacuum disturbances which produce variations in the vacuum level in said line;
   a high vacuum reserve;
   a connector having a first outlet connected to said high vacuum reserve, a second outlet connected to said low vacuum line, orifice means between said first and second outlets, and a valve for said orifice to control air flow between said low vacuum line and said high vacuum reserve;
   a vacuum reference chamber connected to said high vacuum reserve for producing a high vacuum reference level;
   a vacuum sensor chamber connected only to said low vacuum line for sensing the level of vacuum in said low vacuum line;
   a movable diaphragm connected between and separating said reference chamber and said sensor chamber, the diaphragm moving in response to changes in the low vacuum level in said sensor chamber;
   means connecting said valve to said diaphragm to adjust said valve in response to motion of said diaphragm to thereby regulate air flow through said orifice from said low vacuum line to said high vacuum reserve to thereby regulate the vacuum level in said low vacuum line.

6. The controller of claim 5, further including a regulator for said reference vacuum chamber, said reference regulator including adjustment means for establishing a reference level of vacuum in said reference chamber.

7. The controller of claim 6, wherein said reference regulator adjustment means includes valve means for admitting controlled amounts of ambient air into said reference chamber.

8. The controller of claim 6, wherein said reference regulator adjustment means is connected to said reference chamber for regulating the high vacuum level in said reference chamber and thereby regulating the movement of said diaphragm and said valve, whereby said low vacuum level in said low vacuum line is regulated without admission of ambient air into said low vacuum line.

* * * * *

UNITED STATES PATENT AND TRADEMARK OFFICE
CERTIFICATE OF CORRECTION

PATENT NO. : 5,284,180
DATED : February 8, 1994
INVENTOR(S) : GUO et al.

It is certified that error appears in the above-indentified patent and that said Letters Patent is hereby corrected as shown below:

Column 9, line 48, after "said" insert --sensor chamber--:

Column 9, lines 49 and 50, after "said" (second occurrence), delete --sensor chamber--.

Signed and Sealed this

Twenty-first Day of June, 1994

Attest:

BRUCE LEHMAN

*Attesting Officer*      *Commissioner of Patents and Trademarks*